US008362104B2

(12) United States Patent
López Muñoz

(10) Patent No.: US 8,362,104 B2
(45) Date of Patent: Jan. 29, 2013

(54) METHOD FOR THE PRODUCTION OF A DIGITAL PRINTING INK AND PRODUCT THUS PRODUCED

(75) Inventor: Antonio López Muñoz, Rubi (ES)

(73) Assignee: Chimigraf Iberica, SL, Rubi (ES)

( * ) Notice: Subject to any disclaimer, the term of this patent is extended or adjusted under 35 U.S.C. 154(b) by 1586 days.

(21) Appl. No.: 10/550,007

(22) PCT Filed: Mar. 11, 2004

(86) PCT No.: PCT/ES2004/000111
§ 371 (c)(1),
(2), (4) Date: Jun. 23, 2006

(87) PCT Pub. No.: WO2004/085554
PCT Pub. Date: Oct. 7, 2004

(65) Prior Publication Data
US 2007/0244218 A1 Oct. 18, 2007

(30) Foreign Application Priority Data

Mar. 24, 2003 (ES) .................................. 200300676

(51) Int. Cl.
C08F 2/48 (2006.01)

(52) U.S. Cl. .................... 522/186; 106/31.6; 106/31.85; 427/511; 427/514

(58) Field of Classification Search .................. 522/186; 106/31.6, 31.85; 427/511, 514
See application file for complete search history.

(56) References Cited

U.S. PATENT DOCUMENTS

| 4,271,258 | A | | 6/1981 | Watariguchi |
| 4,388,427 | A | | 6/1983 | Nishikawa et al. |
| 5,106,533 | A | | 4/1992 | Hendrickson et al. |
| 5,275,646 | A | * | 1/1994 | Marshall et al. ........... 106/31.32 |
| 5,443,628 | A | | 8/1995 | Loria et al. |
| 5,679,138 | A | | 10/1997 | Bishop et al. |
| 5,830,927 | A | | 11/1998 | Vanderhoff et al. |
| 5,969,002 | A | | 10/1999 | Kijlstra et al. |
| 5,969,003 | A | | 10/1999 | Foucher et al. |
| 5,973,062 | A | | 10/1999 | Harris et al. |
| 6,071,989 | A | | 6/2000 | Sieber et al. |
| 6,103,780 | A | | 8/2000 | Matzinger et al. |
| 6,110,266 | A | | 8/2000 | Gonzalez-Blanco et al. |
| 6,113,679 | A | | 9/2000 | Adkins et al. |
| 6,114,404 | A | | 9/2000 | Deeken et al. |
| 6,114,406 | A | | 9/2000 | Caiger et al. |
| 6,225,369 | B1 | | 5/2001 | Jeon |
| 6,232,359 | B1 | | 5/2001 | Christian |
| 6,379,444 | B1 | | 4/2002 | Adkins et al. |
| 6,433,038 | B1 | | 8/2002 | Tanabe et al. |
| 6,500,248 | B1 | | 12/2002 | Hayashi |
| 6,593,390 | B1 | * | 7/2003 | Johnson et al. ................. 522/74 |
| 6,726,762 | B2 | | 4/2004 | Okamoto et al. |
| 6,767,980 | B2 | | 7/2004 | Yurugi et al. |
| 7,015,257 | B2 | * | 3/2006 | Hayashi ........................ 522/181 |
| 2003/0149130 | A1 | * | 8/2003 | Kondo ............................ 523/160 |
| 2003/0199612 | A1 | * | 10/2003 | Nakajima ....................... 523/160 |

FOREIGN PATENT DOCUMENTS

| EP | 0106628 | | 4/1984 |
| ES | 2200711 | | 3/2004 |
| GB | 2211791 | | 7/1989 |
| WO | WO03/054091 A1 | * | 7/2003 |
| WO | 2012/006047 | | 1/2012 |

OTHER PUBLICATIONS

Dow Chemical Co. "Technical data sheet for tripropylene glycol acrylate grade" two pages (not dated).
Dow Chemical Co. *A Guide to Glycols*, 58 pages (2003).
InkTec Corp. "Solvent-based pigment ink material safety data sheet" 11 pages (May 2009).
Jestbest Corp. "ECO-King ink material safety data sheet" six pages (Oct. 2011).
Lombardi & Gasper "Acrylic Polymers" *Coating Technology Handbook*, $3^{rd}$ Ed., Tracton editor, Chapter 46, pp. 46-1 to 46-10, CRC Press (2005).
Sigma-Aldrich Co., "Safety data sheet for hexanediol diacrylate" six pages (Jan. 2012).

* cited by examiner

*Primary Examiner* — Vu A Nguyen
(74) *Attorney, Agent, or Firm* — Nixon & Vanderhye P.C.

(57) ABSTRACT

The invention relates to a method for the production of a digital printing ink and to the ink thus obtained. The inventive method comprises the following phases consisting in: dispersing pigments in a mixture of oligomers and monomers, including polyol acrylates, with a maximum particle size of 1 micrometer; diluting same with a mixture of monofunctional and multifunctional acrylic monomers until a viscosity of between 10 and 30 centipoise is obtained; introducing a photoinitiator system, which starts the polymerization of the oligomers and monomers from the first phase, in the presence of ultraviolet radiation; and subjecting the resulting ink to a filtration process.

20 Claims, No Drawings

METHOD FOR THE PRODUCTION OF A DIGITAL PRINTING INK AND PRODUCT THUS PRODUCED

Method of producing a digital printing ink and ink thus obtained characterized by including the following steps: dispersing pigments in a mixture of oligomers and monomers with a maximum particle size of 1 micron; diluting same with a mixture of monofunctional and multifunctional acrylic monomers until a viscosity of between 10 and 30 centipoises is obtained; introducing a photoinitiator system which causes the polymerization of the oligomers and monomers from the first step, in the presence of ultraviolet radiation; and subjecting the resulting ink to a filtration process.

BACKGROUND OF THE INVENTION

Different state-of-the-art procedures and ultraviolet curing inks are known for digital printing. Specifically, this refers to inks based in monofunctional monomers.

Other digital inks can be for laser printers. These inks start out with toner or powdered ink and through an electrostatic charge from the printer transfer the ink using a laser beam.

Also known are inkjet inks that use nozzles to direct the ink using previously digitized information from the computer.

Computer to Plate printing inks are also known, consisting of a previously created computer file, which will make the electronic stamping on the plates.

In fact, the vast majority of inks known to date follow the same scheme:

A sublimatable pigment or mixture of pigments to which a soluble resin is added to be used as a medium.

Then, an organic solvent is introduced (water-based or pure), or a mixture of a water-based organic solvent and a pure one.

Finally, a resin is used as a thickening agent or as adhesive for the ink.

Also, it can be noted that resins can be identical and that they can include additives like ethyl alcohol or butanol, among others.

This outline is followed by the 1973 Spanish patent No. 413.791 from CIBA-GEIGY AG, consisting of a method to prepare printing inks for printing by transference through sublimation, where the advantage is in allowing the combination of concentrated preparations rich in pigments.

U.S. Pat. No. 6,383,274 describes an inkjet water-based printing ink in which the printing bleeding agent includes a fluorinated composition, specifically a perfluoroalkyl acid salt. This patent underlines that the advantages of these inks are: reduction of drying time and, specially, prevention of ink bleeding.

BRIEF DESCRIPTION OF THE REQUESTED INVENTION

The present invention is an advancement in the field of ink production, particularly inks for digital printing.

Such inks, once printed on the media, are dried through radiation, which causes the polymerization of the ink, and results in an immediate fixation to the media as well as feeling dry to the touch.

This ink completely changes the concept of previously mentioned inks because it has a pigment or mixture of pigments but lacks any kind of resin used as a medium, or any organic solvent or resin that might serve as thickening agent, because its special composition makes this unnecessary.

All of this because the medium for the procedure is formed at the time of the polymerization of the monomers and oligomers.

At the same time, monomers and oligomers themselves act as solvents, thus forming the resin at the time of polymerization.

For all these reasons, the use of water or other solvents is not necessary in order to produce this ink.

Specific Process for the Requested Patent

Thus, the specific process or the present invention requires that in order to produce an ink-jet digital printing ink, the following steps must be completed:

For the first step, proceed to the dispersion of pigments in a mixture of oligomers and monomers, in such a way that the maximum size of the particle would not be more than 1 micron.

Such dispersion of pigments is obtained by using a high energy ball mill, combined with the application of a constant temperature between 35° C. and 80° C., milling until an average particle size between 0.1 and 0.8 microns is obtained, and combining all of the above with a mixture of polyol acrylate monomers and dispersants, in order to avoid re-agglomeration of dispersing pigments.

This is subsequently diluted with a mixture of monofunctional and multifunctional acrylic monomers until a viscosity between 10 and 30 centipoises is achieved.

Thus, regarding this monofunctional acrylic monomer, the ideal ratio is the one found between 10% and 25% of total acrylic monomers.

Of the multifunctional acrylic monomers, between 50% and 90% of total acrylic monomers, those that are bifunctional or trifunctional must be differentiated.

Among bifunctional acrylic monomers, hexanediol diacrylate, tripropylene glycol diacrylate, and dipropylene glycol diacrylate will be used for this specific process.

Among trifunctional acrylic monomers, ethoxylated trimethylolpropane triacrylate will be used.

Also, this formulation uses polyol acrylates to improve humectation of the pigments.

Then, a photoinitiator system is introduced, which starts the polymerization of the oligomers and monomers from the first step, because of the liberation of radicals after being subject to ultraviolet radiation.

Later, once the ink formulation is finished, and the desired viscosity has been obtained, the resulting ink is subject to a filtration process in order to retain particles by means of successive filters ending with a 1 micron filter, retaining all those particles bigger than 1 micron.

This ink is particularly useful for printing on flexible media, such as paper, plastified elements, plastic films, etc.

Such flexible media, through drop-on-demand piezoelectric heads, also known in the industry as ink-jets, eject ink drops until the desired image or picture is formed.

Once the resulting ink has been printed on a media, a radiation source is applied on the ink, i.e. the light from an ultraviolet lamp or through electron bombing, which fracture the molecules of the photoinitiator system, turning them into free radicals that react, violently and quickly, to the oligomers and monomers, resulting in a polymer that sets the dispersing pigments on the printed media.

The ink thus obtained has as a distinguishable advantage its high reactivity as compared with existing ones, allowing its use on absorbing media obtaining thus good curing of the ink film. This allows direct printing on such media without having to apply a coating to seal the pores.

This invention patent describes a new method of producing a digital printing ink and the ink thus obtained. The examples mentioned herein are not limited to this invention and will therefore have different applications and/or adaptations, all of them within the scope of the following claims.

The invention claimed is:

1. Digital printing ink comprising pigments having a maximum particle size not more than 1 micron and lacking organic solvent, wherein the digital printing ink is produced by a method comprising:
   (a) dispersing pigments in a mixture comprising polymerizable monomers and oligomers, which includes polyol acrylate;
   (b) diluting the mixture with monofunctional and multifunctional acrylic monomers until a viscosity of between 10 and 30 centipoises is achieved, between 10% and 25% of total acrylic monomers are monofunctional acrylic monomers, isobornyl acrylate is among the monofunctional acrylic monomers, between 50% and 90% of total acrylic monomers are multifunctional acrylic monomers, and bifunctional and trifunctional acrylic monomers are among the multifunctional acrylic monomers;
   (c) introducing a photoinitiator system, which starts polymerization of the monomers and oligomers by irradiation with ultraviolet light, to the diluted mixture; and
   (d) filtering to retain particles bigger than 1 micron, thereby obtaining the digital printing ink lacking organic solvent as a result.

2. Digital printing ink according to claim 1 characterized by having hexanediol diacrylate among the bifunctional acrylic monomers.

3. Digital printing ink according to claim 1 characterized by having tripropylene glycol diacrylate among the bifunctional acrylic monomers.

4. Digital printing ink according to claim 2 characterized by having tripropylene glycol diacrylate among the bifunctional acrylic monomers.

5. Digital printing ink according to claim 1 characterized by having dipropylene glycol diacrylate among the bifunctional monomers.

6. Digital printing ink according to claim 2 characterized by having dipropylene glycol diacrylate among the bifunctional monomers.

7. Digital printing ink according to claim 3 characterized by having dipropylene glycol diacrylate among the bifunctional monomers.

8. Digital printing ink according to claim 4 characterized by having dipropylene glycol diacrylate among the bifunctional monomers.

9. Digital printing ink according to claim 1 characterized by having ethoxylated trimethylolpropane triacrylate among the trifunctional acrylic monomers.

10. Digital printing ink according to claim 2 characterized by having ethoxylated trimethylolpropane triacrylate among the trifunctional acrylic monomers.

11. Digital printing ink according to claim 3 characterized by having ethoxylated trimethylolpropane triacrylate among the trifunctional acrylic monomers.

12. Digital printing ink according to claim 4 characterized by having ethoxylated trimethylolpropane triacrylate among the trifunctional acrylic monomers.

13. Digital printing ink according to claim 5 characterized by having ethoxylated trimethylolpropane triacrylate among the trifunctional acrylic monomers.

14. Method of using digital printing ink according to claim 1, the method comprising: printing the ink on a media and irradiating the ink with ultraviolet light, which fractures molecules of the photoinitiator system and turn them into free radicals, to set dispersed pigments on the media by polymerization of the monomers and oligomers.

15. Method of producing digital printing ink comprising pigments having a maximum particle size not more than 1 micron and lacking organic solvent, the method comprising:
   (a) dispersing pigments in a mixture comprising polymerizable monomers and oligomers, which includes polyol acrylate;
   (b) diluting the mixture with monofunctional and multifunctional acrylic monomers until a viscosity of between 10 and 30 centipoises is achieved, between 10% and 25% of total acrylic monomers are monofunctional acrylic monomers, isobornyl acrylate is among the monofunctional acrylic monomers, between 50% and 90% of total acrylic monomers are multifunctional acrylic monomers, and bifunctional and trifunctional acrylic monomers are among the multifunctional acrylic monomers;
   (c) introducing a photoinitiator system, which starts polymerization of the monomers and oligomers by irradiation with ultraviolet light, to the diluted mixture; and
   (d) filtering to retain particles bigger than 1 micron, thereby obtaining the digital printing ink lacking organic solvent as a result.

16. Method according to claim 15 characterized by dispersion of the pigments in the mixture by milling at a constant temperature between 35° C. and 80° C. to an average particle size between 0.1 and 0.8 microns.

17. Method according to claim 15 characterized by having hexanediol diacrylate among the bifunctional acrylic monomers.

18. Method according to claim 15 characterized by having tripropylene glycol diacrylate among the bifunctional acrylic monomers.

19. Method according to claim 15 characterized by having dipropylene glycol diacrylate among the bifunctional monomers.

20. Method according to claim 15 characterized by having ethoxylated trimethylolpropane triacrylate among the trifunctional acrylic monomers.

* * * * *

UNITED STATES PATENT AND TRADEMARK OFFICE
CERTIFICATE OF CORRECTION

PATENT NO. : 8,362,104 B2  Page 1 of 1
APPLICATION NO. : 10/550007
DATED : January 29, 2013
INVENTOR(S) : Antonio López Muñoz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2007 days.

Signed and Sealed this
First Day of September, 2015

Michelle K. Lee
*Director of the United States Patent and Trademark Office*